J. J. COBURN.

Friction-Clutch Mechanisms.

No. 5,811. Reissued March 31, 1874.

John J. Coburn

WITNESSES

Anthony Connolly

J. P. Connolly

By Connolly Bros

INVENTOR

Attorneys.

AM. PHOTO-LITHOGRAPHIC Co. N. Y. (OSBORNE'S PROCESS)

UNITED STATES PATENT OFFICE.

JOHN J. COBURN, OF PHILADELPHIA, PENNSYLVANIA, ASSIGNOR OF ONE-HALF INTEREST TO HUGH B. COYLE.

IMPROVEMENT IN FRICTION-CLUTCH MECHANISMS.

Specification forming part of Letters Patent No. 138,075, dated April 22, 1873; reissue No. 5,811, dated March 31, 1874; application filed February 5, 1874.

*To all whom it may concern:*

Be it known that I, JOHN J. COBURN, of Philadelphia, in the county of Philadelphia and State of Pennsylvania, have invented Improvements in Friction-Clutch Mechanism, of which the following is a specification, reference being had to the accompanying drawings, in which—

Figure 1:
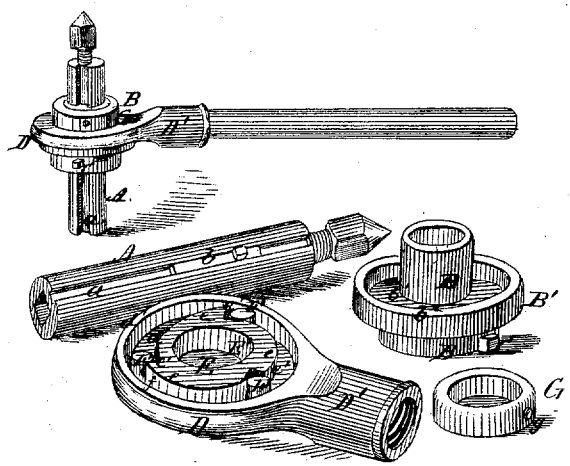
Figure 2:
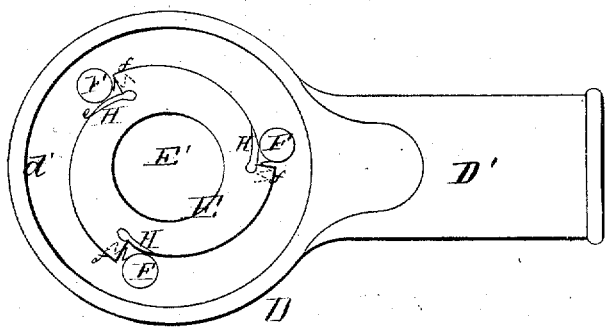

Figure 1 represents perspective views of the clutch complete and the various parts separated. Fig. 2 is a plan view of one section.

My invention has for its object to provide a friction-clutch mechanism of simple construction and low cost, which will be perfect in its operation, easily manipulated, not liable to get out of repair, and very durable. The nature of my invention consists in the novel construction and combination of parts, as hereinafter fully described.

Referring to the accompanying drawing, which illustrates my invention, A represents a shaft or spindle, having a longitudinal groove, *a*. B is a sleeve fitted on said spindle. and fastened thereto by means of a spline or sliding block, *b*, which moves in the groove *a*, and a set-screw, C. B′ is a cup, forming a part of the sleeve B, and consisting of the disk $b^1$ and flanch $b^2$. D is another cup, having an extension, D′, forming a socket for the insertion of a handle. Said cup D consists of the disk *d* and flanch *d′*. E is a cam projection on the disk *d*, having eccentric facets *e* and shoulders *e′*. F F are rollers, whose ends rest upon and move against the disks $b^1$ and *d*, their peripheries impinging upon springs *f* inserted in suitable recesses in the shoulders of the cam E. The cam E has a central opening, E′, through which passes the sleeve B, a ring, G, having a screw, *g′*, by which the parts are held in position, being fitted over said sleeve, as shown. H H are steel shoes, fitted in suitable recesses in the facets *e*, and designed to take the wear of the steel rollers F F.

When the cup D is turned in the direction of the arrow the spindle remains stationary, said cup turning freely on the sleeve B, and the rollers F F working against the springs *f f*. When, however, the cup D is turned in the opposite direction, the rollers F F are moved in the direction of the arrow upon the facets *e*, causing said rollers to bind between the shoes and said facets and the flanch $b^2$, moving the sleeve B and with it the spindle A.

The object of the springs *f f* is to hold the rollers in position so as to catch and bind, as just described, on the forward motion of the handle.

The diameter of the rollers should be greater than the depth of the shoulders *e′*, and a trifle less than the distance between the inner termination of said shoulders and the flanch $b^2$.

The action or direction of motion of the clutch may be at any time reversed by sliding off the sleeve from the spindle A, inverting it, and restoring it to position on said spindle.

The advantage of the spline as a bearing for the set-screw is, that it prevents said screw from indenting the surface of the spindle A.

The arrangement of the sleeve to slide to and fro on the spindle from end to end is of very material advantage, particularly for use in connection with drills.

What I claim as my invention is—

1. The cup D, provided with annular flange *d′*, having the centrally-located cam E with opening E′, facets *e*, and shoulders *e′*, substantially as shown and described.

2. The sleeve B having the cup B′, formed of the disk $b^1$ and flanch $b^2$, in combination with the grooved spindle A, substantially as shown.

3. The combination of the grooved spindle A, sleeve B, and cup D, substantially as shown and described.

4. In combination with the cup D having the centrally-located cam E, and sleeve B having the cup B′, the rollers F, substantially as shown.

5. In combination with the cup D and rollers F F, the springs *f f*, substantially and for the purpose set forth.

6. The grooved spindle A, holding the spline *b* with gib, substantially as shown.

7. In the clutch mechanism, as described, the removable steel shoe inserted within the cavity and upon the bearing-surface of the rollers or equivalent, as and for the purpose set forth.

8. The combination of the cup, disk, rollers, steel shoe, spring, and shaft, substantially as described.

In testimony that I claim the foregoing I have hereto set my hand this 31st day of January, A. D. 1874.

JOHN J. COBURN.

Witnesses:
JOHN A. BELL,
M. DANL. CONNOLLY.